United States Patent
Kim et al.

(10) Patent No.: US 8,679,428 B2
(45) Date of Patent: Mar. 25, 2014

(54) METHOD FOR PREPARING HIGH-PURITY LITHIUM CARBONATE FROM BRINE

(75) Inventors: Joon-Soo Kim, Daejeon (KR); Kyeong-Woo Chung, Daejeon (KR); Jin-Young Lee, Daejeon (KR); Sung-Don Kim, Daejeon (KR)

(73) Assignee: Korea Institute of Geosciences and Mineral Resources (KIGAM), Daejeon (KR)

( * ) Notice: Subject to any disclaimer, the term of this patent is extended or adjusted under 35 U.S.C. 154(b) by 0 days.

(21) Appl. No.: 13/634,799

(22) PCT Filed: Oct. 12, 2011

(86) PCT No.: PCT/KR2011/007593
§ 371 (c)(1),
(2), (4) Date: Sep. 13, 2012

(87) PCT Pub. No.: WO2012/067348
PCT Pub. Date: May 24, 2012

(65) Prior Publication Data
US 2012/0328498 A1    Dec. 27, 2012

(30) Foreign Application Priority Data
Nov. 17, 2010  (KR) .................. 10-2010-0114451

(51) Int. Cl.
*C01D 15/00*  (2006.01)

(52) U.S. Cl.
USPC ........ 423/179.5; 423/421; 423/158; 423/164; 423/165

(58) Field of Classification Search
USPC .................. 423/179.5, 421, 158, 164, 165
See application file for complete search history.

(56) References Cited

U.S. PATENT DOCUMENTS

| | | | |
|---|---|---|---|
| 4,207,297 A * | 6/1980 | Brown et al. .............. | 423/179.5 |
| 5,993,759 A | 11/1999 | Wilkomirsky | |
| 6,143,260 A | 11/2000 | Boryta | |
| 7,157,065 B2 | 1/2007 | Boryta et al. | |
| 2003/0231996 A1 * | 12/2003 | Shiu et al. .................. | 423/179.5 |
| 2004/0074774 A1 | 4/2004 | Chang et al. | |
| 2007/0160516 A1 | 7/2007 | Boryta et al. | |

FOREIGN PATENT DOCUMENTS

WO        2010006366 A1    1/2010

OTHER PUBLICATIONS

International Search Report mailed May 9, 2012 for PCT/KR2011/007593.
Nitta, Yoshitaka, Recovery of Lithium From Seawater Used for Cooling in Power Plant, Chemical Abstracts, Aug. 6, 1990, p. 113:43348p, vol. 113, No. 6, Columbus, Ohio, US.

* cited by examiner

*Primary Examiner* — Steven Bos
(74) *Attorney, Agent, or Firm* — Lowe Hauptman & Ham, LLP

(57) ABSTRACT

The present disclosure provides a method of preparing highly pure lithium carbonate from brine. The method includes adding an adsorbent to the brine, from which the magnesium ions $Mg^{2+}$ have been removed, to adsorb lithium ions $Li^+$ to the adsorbent, followed by providing the adsorbent having the lithium ions $Li^+$ adsorbed thereto to a strong acid solution to desorb the lithium ions $Li^+$ from the adsorbent; enriching the strong acid solution in which the lithium ions $Li^+$ are desorbed from the adsorbent; and obtaining lithium carbonate $Li_2CO_3$ through chemical reaction between the lithium ions $Li^+$ in the enriched solution and a carbonate precursor.

13 Claims, 1 Drawing Sheet

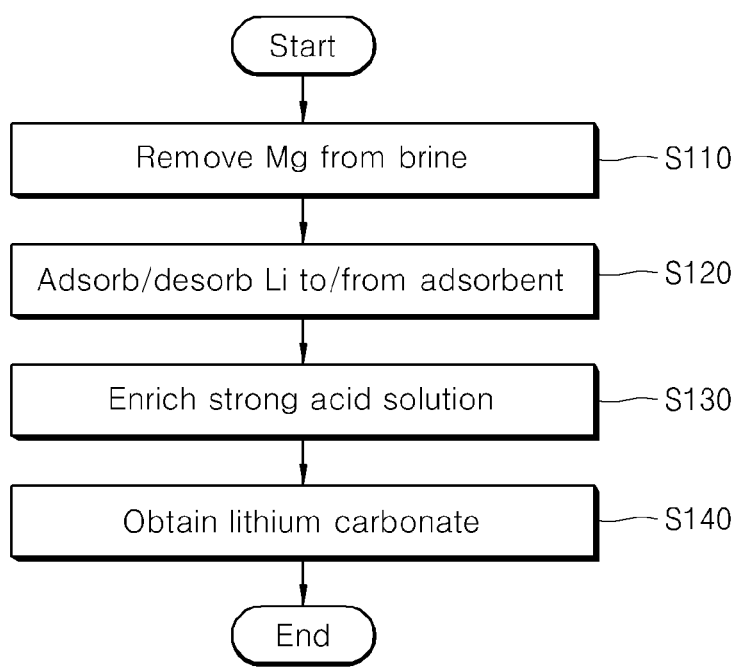

METHOD FOR PREPARING HIGH-PURITY LITHIUM CARBONATE FROM BRINE

CROSS REFERENCE TO RELATED APPLICATION

This application claims the priority of Korean Patent Application No. 10-2010-0114451, filed on Nov. 17, 2010 in the KIPO (Korean Intellectual Property Office). Further, this application is the National Phase application of International Application No. PCT/KR2011/007593 filed Oct. 12, 2011, which designates the United States and was published in Korean.

BACKGROUND

1. Technical Field

The present invention relates to a method of preparing lithium carbonate $Li_2CO_3$ used for lithium secondary batteries, and more particularly to a method of preparing highly pure lithium carbonate from brine.

2. Description of the Related Art

With a recent increase in demand for lithium secondary batteries, lithium carbonate $Li_2CO_3$ for a positive electrode material has also been increasingly demanded.

Lithium carbonate can be prepared in various ways. Recently, many studies have been conducted to prepare lithium carbonate from lithium contained in brine.

Brine contains many ionic components such as lithium ions, magnesium ions, sodium ions, chlorine ions, and the like.

In order to prepare lithium carbonate from brine, a conventional process includes preparing a lithium solution by separating other components from the brine except for lithium components, followed by enrichment of the prepared lithium solution.

However, the process of preparing the lithium solution through separation of other components except for the lithium components is complicated and requires a long process time.

BRIEF SUMMARY

The present invention provides a method of preparing lithium carbonate having a high purity of 99% from brine through a simple process within a short period of time.

In accordance with an aspect of the invention, a method of preparing lithium carbonate includes: removing magnesium ions $Mg^{2+}$ from brine; adding an adsorbent to the brine, from which the magnesium ions $Mg^{2+}$ have been removed, to adsorb lithium ions $Li^+$ to the adsorbent, followed by providing the adsorbent having the lithium ions $Li^+$ adsorbed thereto to a strong acid solution to desorb the lithium ions $Li^+$ from the adsorbent; enriching the strong acid solution in which the lithium ions $Li^+$ are desorbed from the adsorbent; and obtaining lithium carbonate $Li_2CO_3$ through chemical reaction between the lithium ions $Li^+$ in the enriched solution and a carbonate precursor.

In accordance with another aspect of the invention, a method of preparing lithium carbonate includes: removing magnesium ions $Mg^{2+}$ from brine; adding an adsorbent to the brine, from which the magnesium ions $Mg^{2+}$ have been removed, to adsorb lithium ions $Li^+$ to the adsorbent, followed by providing the adsorbent having the lithium ions $Li^+$ adsorbed thereto to a strong acid solution to desorb the lithium ions $Li^+$ from the adsorbent; and obtaining lithium carbonate $Li_2CO_3$ through chemical reaction between the desorbed lithium ions $Li^+$ in the enriched solution and a carbonate precursor.

As such, according to exemplary embodiments of the invention, the method of preparing lithium carbonate from brine may prepare highly pure lithium carbonate through simple processes including a process of removing magnesium ions, a process for adsorption/desorption of lithium ions $Li^+$, an enrichment process and a process of obtaining lithium carbonate.

Further, the method of preparing lithium carbonate from brine according to the embodiments of the invention does not need a process for removing impurities except for magnesium, thereby reducing process time.

BRIEF DESCRIPTION OF THE DRAWING

The above and other aspects, features, and advantages of the invention will become apparent from the following detailed description of exemplary embodiments in conjunction with the accompanying drawing, in which:

FIG. 1 is a flowchart of a method of preparing lithium carbonate from brine in accordance with an exemplary embodiment of the present invention.

DETAILED DESCRIPTION

Exemplary embodiments of the invention will now be described in detail with reference to the accompanying drawing. It should be understood that the present invention is not limited to the following embodiments and may be embodied in different ways, and that the embodiments are given to provide complete disclosure of the invention and to provide thorough understanding of the invention to those skilled in the art. The scope of the invention is limited only by the accompanying claims and equivalents thereof. Like components will be denoted by like reference numerals throughout the specification and the accompanying drawing.

Hereinafter, a method of preparing lithium carbonate from brine in accordance with an exemplary embodiment of the present invention will be described in detail with reference to the accompanying drawing.

FIG. 1 is a flowchart of a method of preparing lithium carbonate from brine in accordance with an exemplary embodiment of the present invention.

Referring to FIG. 1, the method of preparing lithium carbonate from brine in accordance with the exemplary embodiment includes a magnesium removal operation S110, a lithium adsorption/desorption operation S120, an enrichment operation S130, and a lithium carbonate obtaining operation S140.

Magnesium Removal

In the magnesium removal operation S110, magnesium ions $Mg^{2+}$ are removed from brine.

The magnesium ions $Mg^{2+}$ have a smaller size than lithium ions $Li^+$ Thus, the magnesium ions $Mg^{2+}$ also tend to be adsorbed together with the lithium ions $Li^+$ upon adsorption of the lithium ions as described below, and there is a need for previous removal of the magnesium ions $Mg^{2+}$ from the brine before adsorption of the lithium ions $Li^+$.

Removal of the magnesium ions $Mg^{2+}$ may be performed by settling precipitates of the magnesium ions $Mg^{2+}$ in the form of magnesium hydroxide, magnesium oxalate, magnesium carbonate, and the like.

Table 1 shows a removal rate of magnesium ions $Mg^{2+}$ and a co-precipitation rate according to a method of removing magnesium ions $Mg^{2+}$.

TABLE 1

| Kind | Hydroxide | Oxalate | Carbonate |
|---|---|---|---|
| Mg removal rate (%) | 99.9 | 99.9 | 99.9 |
| Li co-precipitation rate (%) | 4.7 | 15.3 | 12.2 |

Referring to Table 1, the removal rate of magnesium ions $Mg^+$ is 99.9% in any precipitate form of magnesium hydroxide, magnesium oxalate and magnesium carbonate.

However, the co-precipitation rate of lithium ions $Li^+$ varies depending on the form of magnesium precipitate. More specifically, since the co-precipitation rate of lithium ions $Li^+$ is lower in the precipitate form of magnesium hydroxide than in the precipitate forms of magnesium oxalate and magnesium carbonate, it is desirable that the magnesium ions $Mg^{2+}$ be removed in the precipitate form of magnesium hydroxide.

When the magnesium ions $Mg^+$ are removed in the precipitate form of magnesium hydroxide, NaOH, KOH, CaO and the like may be used for precipitation of magnesium hydroxide.

Particularly, CaO may be used in terms of economic feasibility.

Lithium Adsorption/Desorption

Next, in the lithium adsorption/desorption operation S120, lithium ions $Li^+$ are adsorbed to an adsorbent for a predetermined period of time (lithium desorption) by adding the adsorbent to the brine from which the magnesium ions $Mg^+$ have been removed in the magnesium removal operation S110. Then, the adsorbent to which the lithium ions $Li^+$ are adsorbed is supplied to a strong acid solution such as hydrochloric acid HCl to desorb the lithium ions $Li^+$ from the adsorbent (lithium desorption).

Adsorption of the lithium ions $Li^+$ may be achieved using manganese oxide or aluminum oxide.

Table 2 shows adsorption amounts of lithium ions and other ions per unit weight according to the kind of adsorbent.

TABLE 2

| (unit: mg/g) | | | | | |
|---|---|---|---|---|---|
| Kind | Li | Mg | Na | K | Ca | B |
| Mn oxide | 17.3 | 0 | 0.3 | 0.1 | 1.1 | 0.05 |
| Al oxide | 12.5 | 0 | 0.1 | 0.1 | 0.8 | 0.02 |

Referring to Table 2, it can seen that, when manganese oxide is used as the adsorbent, the adsorption rate of the lithium ions $Li^+$ is higher than in the case of using aluminum oxide. Thus, manganese oxide may be used as the adsorbent in order to increase the adsorption rate of the lithium ions $Li^+$.

In desorption of the lithium ions $Li^+$, a strong acid solution such as a hydrochloric acid solution, a nitric acid solution, a sulfuric acid solution, or the like may be used.

After the lithium adsorption/desorption operation S120 or the enrichment operation S130 as described below, the method may further include a process of neutralizing the strong acid solution.

Enrichment

In the enrichment operation S130, the strong acid solution in which the lithium ions $Li^+$ are desorbed is subjected to an enrichment process.

The enrichment process may be performed to enrich the strong acid solution such that the lithium ions $Li^+$ may be present in a concentration of 4 wt % or more therein, and preferably 6±0.5 wt %. If the concentration of lithium ions $Li^+$ does not reach 4 wt % after the enrichment process, an increase in concentration of lithium ions $Li^+$ by the enrichment process can be considered insufficient. Although the concentration of lithium ions $Li^+$ may increase with increasing number of times of performing the enrichment process, the time and cost for enrichment also increase thereby. Thus, the enrichment operation may be performed to have a concentration of lithium ions $Li^+$ of about 6 wt %.

The enrichment operation may be performed using sunlight.

In this embodiment, the brine may be natural brine. Alternatively, the brine may be synthetic brine which contains lithium ions, magnesium ions, sodium ions, potassium ions, chlorine ions and boron ions, as shown in Table 3.

Table 3 shows one example of compositions of synthetic brine.

TABLE 3

| Kind | Li | Mg | Na | K | Cl | B |
|---|---|---|---|---|---|---|
| Concentration (ppm) | 500 | 10,000 | 100,000 | 20,000 | 200,000 | 50 |

Table 4 shows the amount of lithium ions and other ions after the enrichment operation, in which synthetic brine containing components as shown in Table 3 is subjected to removal of magnesium ions $Mg^+$ in the precipitate form of magnesium hydroxide, adsorption and desorption of lithium ions using a hydrochloric acid solution, and enrichment using sunlight.

TABLE 4

| (unit: ppm) | | | | | |
|---|---|---|---|---|---|
| Kind | Li | Mg | Na | K | B |
| Mn oxide | 1040 | 0 | 16 | 4.8 | 2 |
| Al oxide | 760 | 0 | 5.2 | 4.8 | 0.8 |

Referring to Table 4, it can seen that, when manganese oxide is used as the absorbent of the lithium ions, the concentration of lithium ions $Li^+$ is higher even after desorption and enrichment of the lithium ions $Li^+$ than in the case of using aluminum oxide, and that the lithium-enriched solution has a significantly reduced concentration of impurities with respect to any adsorbent.

Although the enrichment operation S130 is not an essential process for the method according to this embodiment, the content of lithium ions $Li^+$ may be increased through the enrichment operation, thereby increasing the amount of lithium finally obtained.

Yield of Lithium Carbonate

In the lithium carbonate obtaining operation S140, the lithium ions $Li^+$ contained in the enriched solution are chemically reacted with a carbonate precursor to obtain lithium carbonate $Li_2CO_3$.

The carbonate precursor may include carbon dioxide $CO_2$.

The lithium carbonate has a high purity of 99%, when prepared by the method described above, that is, through removal of magnesium ions $Mg^{2+}$, adsorption/desorption of lithium ions, enrichment, and yield of lithium carbonate. Accordingly, the method according to the embodiment of the present invention may produce lithium carbonate having a high purity of about 99±1 wt %.

As such, the method according to the embodiment of the invention may produce highly pure lithium carbonate from brine through a simple process and does not need a process of removing impurities except for magnesium, thereby reducing processing time.

Although some embodiments have been described herein, it should be understood by those skilled in the art that these embodiments are given by way of illustration only, and that various modifications, variations, and alterations can be made without departing from the spirit and scope of the invention. Therefore, the scope of the invention should be limited only by the accompanying claims and equivalents thereof.

What is claimed is:

1. A method of preparing lithium carbonate, comprising:
 removing magnesium ions $Mg^{2+}$ from brine;
 adding an adsorbent to the brine, from which the magnesium ions $Mg^{2+}$ have been removed, to adsorb lithium ions $Li^+$ to the adsorbent, and then contacting the adsorbent with a strong acid solution to desorb the lithium ions;
 enriching the strong acid solution containing the desorbed lithium ions; and
 obtaining lithium carbonate $Li_2CO_3$ by chemical reaction between the lithium ions $Li^+$ in the enriched solution and a carbonate precursor.

2. The method of claim 1, wherein the removal of magnesium ions comprises precipitating the magnesium ions $Mg^{2+}$ to produce a magnesium precipitate selected from the group consisting of magnesium oxalate and magnesium carbonate.

3. The method of claim 1, wherein the removal of magnesium ions comprises precipitating the magnesium ions $Mg^{2+}$ to produce a precipitate of magnesium hydroxide.

4. The method of claim 3, wherein the removal of magnesium ions comprises precipitating the magnesium ions $Mg^{2+}$ using one selected from the group consisting of NaOH, KOH and CaO.

5. The method of claim 1, wherein the adsorbent comprises manganese oxide or aluminum oxide.

6. The method of claim 1, wherein the strong acid is selected from the group consisting of hydrochloric acid, sulfuric acid and nitric acid.

7. The method of claim 1, wherein the enrichment of the strong acid solution comprises enriching the strong acid solution to have a concentration of lithium ions $Li^+$ of 4 wt % or more.

8. The method of claim 7, wherein the enrichment of the strong acid solution comprises enriching the strong acid solution to have a concentration of lithium ions $Li^+$ of 6±0.5 wt %.

9. The method of claim 1, wherein the enrichment of the strong acid solution is performed using sunlight.

10. The method of claim 1, further comprising: neutralizing the strong acid solution after desorption of the lithium ions or after the enrichment of the strong acid solution.

11. The method of claim 1, wherein the carbonate precursor comprises carbon dioxide $CO_2$.

12. The method of claim 1, wherein the brine is synthetic brine containing lithium, magnesium, sodium, potassium and boron in the form of ionic components.

13. The method of claim 7, wherein the enrichment of the strong acid solution comprises enriching the strong acid solution to have a concentration of lithium ions $Li^+$ of 6 wt % or more.

* * * * *